United States Patent
Shirakawa et al.

[11] Patent Number: 6,031,358
[45] Date of Patent: Feb. 29, 2000

[54] SHORT PROTECTION CIRCUIT FOR RECHARGABLE BATTERY

[75] Inventors: Hiroshi Shirakawa; Katsumi Hirota, both of San Diego, Calif.

[73] Assignees: Sony Corporation, Tokyo, Japan; Sony Electronics Inc., Park Ridge, N.J.

[21] Appl. No.: 09/110,038

[22] Filed: Jul. 2, 1998

[51] Int. Cl.$^7$ ............................................. H02M 10/36
[52] U.S. Cl. ............................................. 320/136
[58] Field of Search ........................... 320/163, 136, 320/135, 106, 107, 112, 113, 114, 115, DIG. 12; 429/96–100; 324/429; 361/58; 340/636

[56] References Cited

U.S. PATENT DOCUMENTS

| | | | |
|---|---|---|---|
| 4,578,628 | 3/1986 | Siwiak | 320/127 |
| 5,471,128 | 11/1995 | Patino et al. | 320/128 |
| 5,477,130 | 12/1995 | Hashimoto et al. | 320/164 |
| 5,570,255 | 10/1996 | Hirata | 361/58 |
| 5,783,998 | 7/1998 | Nakajou et al. | 340/636 |
| 5,793,186 | 8/1998 | Watabe et al. | 320/112 |
| 5,801,514 | 9/1998 | Saeki et al. | 320/136 |
| 5,834,921 | 11/1998 | Mercke et al. | 320/112 |
| 5,835,989 | 11/1998 | Nagai | 320/112 |

*Primary Examiner*—Adolf Denske Berhane
*Assistant Examiner*—Pia Tibbits
*Attorney, Agent, or Firm*—Philip M. Shaw, Jr.; Crosby, Heafey, Roach & May

[57] ABSTRACT

To adapt to the relative small sizes of portable electronic devices, two battery output terminals of rechargeable batteries are frequently deployed in a close vicinity to each other. Consequently, rechargeable batteries are prone to cause output terminals short. To prevent such output terminals from shorting, a switching circuit and an activating signal generating circuit are deployed between a rechargeable battery and a pair of voltage output terminals. In response to an activating signal generated by the activating signal generating circuit, the switching circuit connects the rechargeable battery to the voltage output terminals. In absence of an activating signal, the switching circuit disconnects the rechargeable battery from the voltage output terminals, so that a short of the output terminals will not occur to the rechargeable battery even if the voltage output terminals are directly connected with each other.

10 Claims, 5 Drawing Sheets

SHORT PROTECTION CIRCUIT FOR RECHARGABLE BATTERY

BACKGROUND OF THE INVENTION

1. Field of the Invention

This invention relates generally to batteries, and, more specifically, to rechargeable batteries for supplying voltages for portable electronic devices.

2. Related Art

Rechargeable batteries are widely used to supply voltages for portable electronic devices, such as: video cameras, cellular phones, portable CD players, note book computers, and personal assistance devices. To adapt to the relative small sizes of power connecters in portable electronic devices, the voltage output terminals of rechargeable batteries are frequently deployed in close vicinity to each other. Consequently, rechargable batteries are prone to cause the output terminals to short circuit. For example, when a rechargeable battery is carried in a pocket or purse, any conductive object (such as a key chain or a chewing gum wrap) there may conductively connect together the voltage output terminals, which may damage the rechargeable battery or even cause a fire accident and injuries.

There is, therefore, a need for an apparatus and method to protect the voltage output terminals of rechargeable batteries from shorting.

The present invention provides an apparatus and method to meet this need.

SUMMARY OF THE INVENTION

To address the shortcomings of the available art, the present invention provides a novel apparatus and method for activating a voltage output for a rechargeable battery.

The method and apparatus of the present invention protects a rechargeable battery from shorting of the output terminals by deploying a switching circuit, and an activating signal generating circuit between the rechargeable battery and the voltage output terminals. In response to an activating signal generated by the activating signal generating circuit, the switching circuit connects the rechargeable battery to the voltage output terminals. In the absence of the activating signal, the switching circuit disconnects the rechargeable battery from the voltage output terminals, so that a short circuit condition at the voltage output terminals will not cause a short circuit condition to the rechargeable battery.

In a broad aspect, the present invention provides an apparatus that comprises: a battery; at least a pair of voltage output terminals for providing an output voltage supplied by the battery to an electronic device; an activating circuit for providing an activating signal only when the battery is attached to an electronic device; and a switching circuit for disconnecting the battery from the voltage output terminals in absence of the activating signal, and for connecting the battery to the voltage output terminals in response to the activating signal.

The present invention also provides a method corresponding to the operation of the apparatus described above.

The foregoing and other features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENTS

Figure 1:
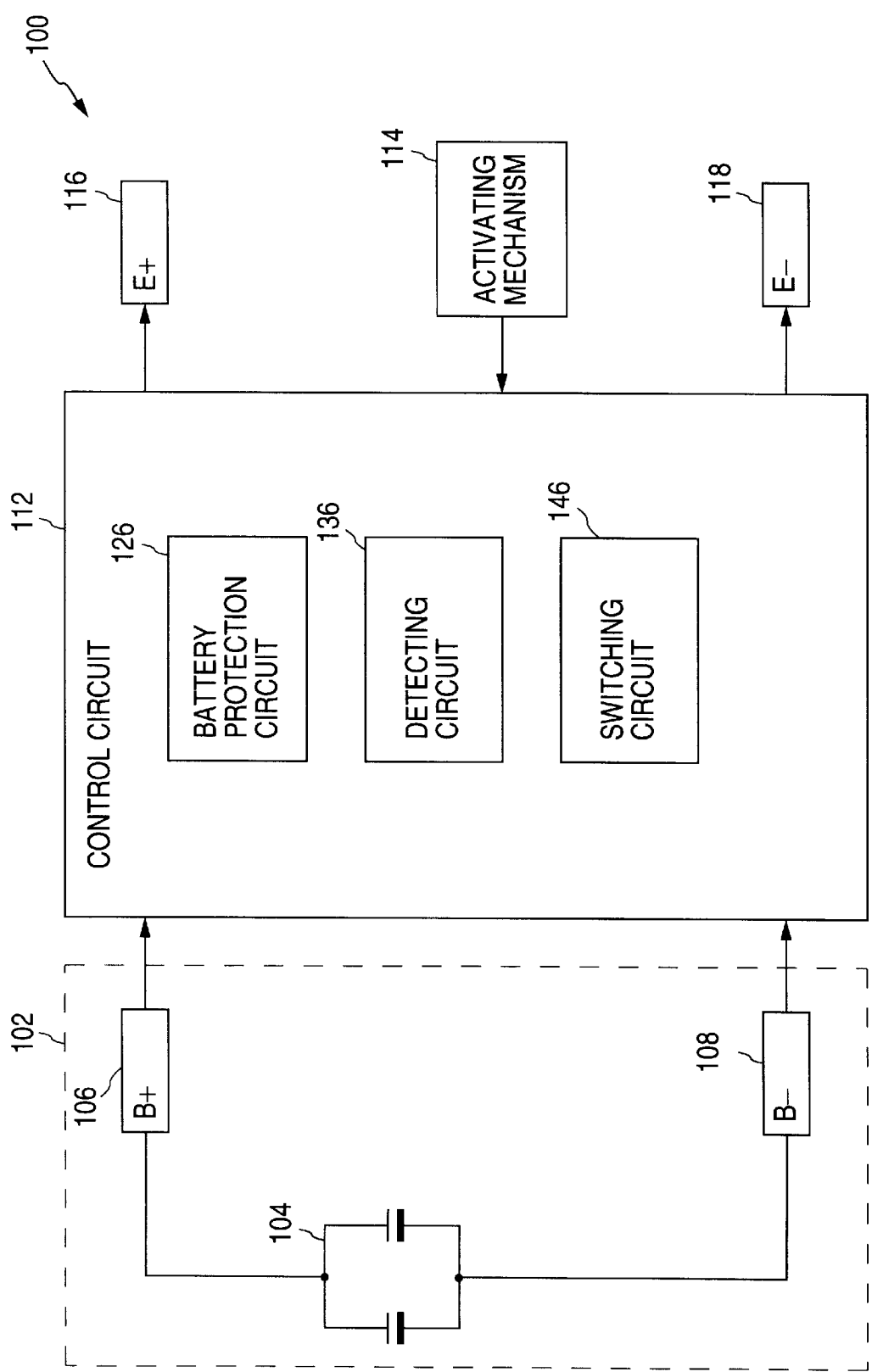
FIG. 1 is a battery system 100 capable of protecting battery output terminals from shorting, in accordance with the present invention.

Referring to FIG. 1, there is shown a battery system 100 capable of protecting battery output terminals from shorting, in accordance with the present invention.

As shown in FIG. 1, the battery system 100 includes a battery unit 102, a control circuit 112, an activating mechanism 114, and at least a pair of voltage output terminals 116 (E+) and 118 (E−). The battery unit 102, activating mechanism 114, and voltage output terminal 116 and 118 are all coupled to the control circuit 112.

The battery unit 102 includes a rechargeable battery cell 104 and at least a pair of battery terminals 106 (B+) and 108 (B−).

The control circuit 112 includes a battery protection circuit 126 for protecting the battery cell 104 from over-current discharging and over-voltage charging, a detecting circuit 136 for detecting an activating signal, and a switching circuit 146 for disconnecting the battery 102 from the voltage output terminals 116 and 118 in the absence of the activating signal, and for connecting the battery unit 102 to the voltage output terminals 116 and 118 in response to the activating signal.

The activating mechanism 114, upon being activated either by connecting a resistor to the activating mechanism or attaching the battery system 100 on an electronic device (not shown), is able to generate an activating signal.

The voltage output terminals 116 and 108, when connected to the battery terminals 106 and 108, are able to provide an output voltage to electronic devices (not shown).

In operation, in the absence of an activating signal from the activating mechanism 114, the switching circuit 146 disconnects either one or both of the battery terminals 106 and 108 (B+ and B−) from the voltage output terminals 116 and 118 (E+ and E−). Therefore, even if the voltage output terminals 116 and 118 are in short circuit condition, it will not cause shorting for the battery unit 102.

To activate the battery system 100, the activating mechanism 114 generates an activating signal. Upon detecting the activating signal by the detecting circuit 136, the switching circuit 146 connects the battery terminals 106 (B+) and 108 (B−) to the voltage output terminals 116 (E+) and 118 (E−) respectively, so that the voltage output terminals 116 and 118 can provide an output voltage supplied by the battery cell 104 to the electronic devices.

Figure 2:
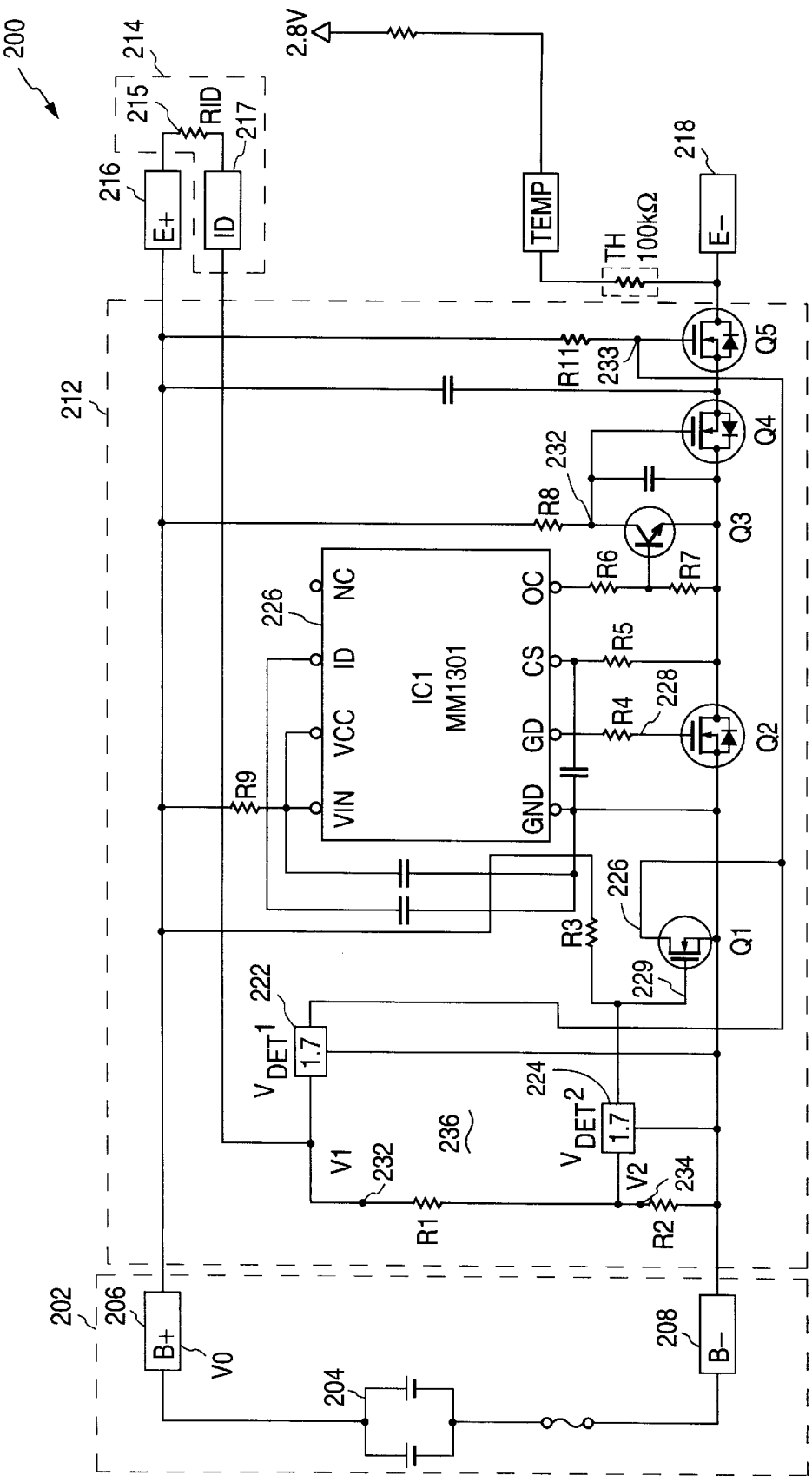
FIG. 2 is a battery system 200 capable of protecting battery output terminals from shorting, in accordance with one embodiment of the present invention.

Referring to FIG. 2, there is shown a battery system 200, in which the components in the battery system 100 are depicted in greater detail, in accordance with one embodiment of the present invention.

As shown in FIG. 2, the battery system 200 includes a battery unit 202, a control circuit 212, an activating mechanism 214, and at least a pair of voltage output terminals 216 (E+) and 218 (E−). The battery unit 202, activating mechanism 214, and voltage output terminals 216 and 218 are all coupled to the control circuit 212.

The battery unit 202 includes a rechargeable battery cell 204, and at least a pair of battery terminals 206 (B+) and 208 (B−). The battery cell 204 provides an open circuit voltage V0 at the positive battery terminal 206.

The activating mechanism 214 includes a removable resistor identifier (RID) 215 and an activating signal input terminal (ID) 217. The RID 215 can be connected between the activating signal input terminal 217 and the positive voltage output terminal 216 (E+).

The control circuit 212 includes four N-channel field-effect transistors (Q1, Q2, Q4, Q5), an NPN junction transistor (Q3), ten resistors (R1–9, R11), two open-drain type voltage detectors 222 and 224, and a battery protection circuit 226. Of these elements, the detecting circuit 236 includes the field-effect transistor Q1, resistors R1–R3, and the open-drain type voltage detectors 222 and 224.

The two open-drain type voltage detectors (222, 224) have their respective threshold voltages (VDET1 and VDET2). The threshold voltages for voltage detectors 222 and 224 are both set at 1.7V. When the voltage detector 222 or 224 receives an input voltage (input voltage>0) which is less than its threshold voltage, it generates a logic low voltage (L). When the voltage detector (222 or 224) receives an input voltage which is greater than its threshold voltage, it is set in an open state. Using the voltage from the positive battery terminal 206 (B+), the R11 and the R3 pull the outputs from detector 222 and 224 to a logic high voltage (H) when these two detectors are in an open state.

In control circuit 212, Q1 inverts the output from the voltage detector 222 at its drain 226, and feeds the inverted output voltage to gate 233 of Q5. Under the control of the output voltages from the detectors 222 and 224, Q5 disconnects negative battery terminal 208 (B−) from the negative voltage output terminal 218 (E−) (when Q5 is turned off), and connects the negative battery terminal 208 (B−) to the negative voltage output terminal 218 (E+) (when Q5 is turned on).

When attached between the positive voltage output terminal 216 (E+) and the activating signal input terminal 217 (ID), the RID 215 provides the battery cell 204 with a current path (through: the positive battery terminal 206 (B+), the positive voltage output terminal 216 (E+), the RID 215, the activating signal input terminal 217 (ID), R1, R2, and the negative battery terminal 208 (B−)). The current in the path generates input voltages V1 and V2 on the connecting points 232 and 234. In response to the input voltages V1 and V2, the voltage detectors 222 and 224 generate output voltages to Q1 and Q5.

In operation, when the RID 215 is detached between the positive voltage output terminal 216 (E+) and activating signal input terminal 217 (ID), the voltage detectors 222 and 224 are both in an open state, because no operating voltage appears at their inputs (input voltages=0). The positive battery terminal 206 provides a high voltage to turn Q1 through R3, generating a logic low voltage (L) on the drain 226 of Q1. Since the output of the voltage detector 222 is connected to the drain 226 of Q1, the output of the voltage detector 222 is pulled down by the output of the drain 226 of Q1. Since the drain 226 of Q1 is a logic low voltage (L), Q5 is turned off, disconnecting the negative battery terminal 208 (B−) from the negative voltage output terminal 218 (E−). At this time, even if the voltage output terminals 216 (E+) and 218 (E−) are directly connected, it will not cause shorting to the battery cell 204.

In the embodiment shown FIG. 2, the conditions to turn on Q5 are designed in accordance with the following equations:

$$2.8V < V0 < 4.3V \text{ (V0 is the battery voltage range)}; \quad (1)$$

$$VDET = VDET1 = VDET2; \quad (2)$$

$$V2 < VDET < V1; \quad (3)$$

and $$(R2 \times V0)/(RID + R1 + R2) < VDET < [(R1 + R2) \times V0]/(RID + R1 + R2). \quad (4)$$

From equation (4):

$$0 < [R2 \times (V0 - VDET) - (R1 \times VDET)]/VDET < RID < [(R1 + R2) \times (V0 - VDET)]/VDET \quad (5)$$

From equation (6), when V0=2.8V, and VDET<V1:

$$VDET < [(R1 + R2) \times 2.8]/(RID + R1 + R2) \quad (6)$$

From equation (6), when V0=4.3V, and VDET>V2:

$$VDET > (R2 \times 4.2)/(RID + R1 + R2) + \text{tm} \quad (7)$$

From equations (6) and (7):

$$R2 < 1.87 R1 \quad (8)$$

From equation (8), select:

$$R2 = 1.8 R1 \quad (9)$$

From equation (5):

$$0 < [R2 \times (V0 - VDET) - (R1 \times VDET)]/VDET \quad (10)$$

From equations (9) and (10):

$$VDET < 0.643 \times V0 \quad (11)$$

From equations (7), if V0=2.8V, then VDET<1.8V, thus select:

$$VDET = 1.7V \quad (12)$$

From equations (9) and (12):

$$1.75 R1 < RID < 1.81 R1 \quad (13)$$

According to equation (13), the RID can be selected as:

$$RID = 1.8 R1 \quad (14)$$

Under the conditions described in equations (1)–(14), when the RID 215 is connected between the positive voltage output terminal 216 (E+) and the activating signal input terminal 217 (ID), the voltage detectors 222 is open because the input voltage VI is greater than 1.7V (the threshold voltage for detector 222), thus generating a logic high voltage (H). The detector 224 generates a logic low voltage (L), because the input voltage V2 is less than 1.7V (the threshold voltage for detector 224). The L output from the voltage detector 224 turns off Q1, generating a logic high voltage (H) at the drain 226 of Q1. Since both the voltage detector 222 and the drain 226 of Q1 provide a logic high voltage (H) to the gate 233 of Q5, Q5 is turned on. At this time, the GD terminal of the battery protection circuit 226 provides a high voltage to turn on Q2. The OC terminal of the battery protection circuit 226 provides a low voltage to turn off Q3 to generate a logic high voltage (H) at its collector 232. The logic high voltage (H) at the collector 232 of Q3 turns Q4 on. As a result, the negative battery terminal 208 (B−) is connected to the negative voltage output terminal 218 (E−).

Advantageously, an output voltage appears on the voltage output terminals 216 (E+) and 218 (E−), only when an RID with a resistance between 1.75R1 and 1.81R1 is connected to the positive voltage output terminal 216 (E+) and the activating signal input terminal 217 (ID). As will be explained in more detail later in this specification, the RID can be installed on the power connectors of the electronic devices.

Figure 3:
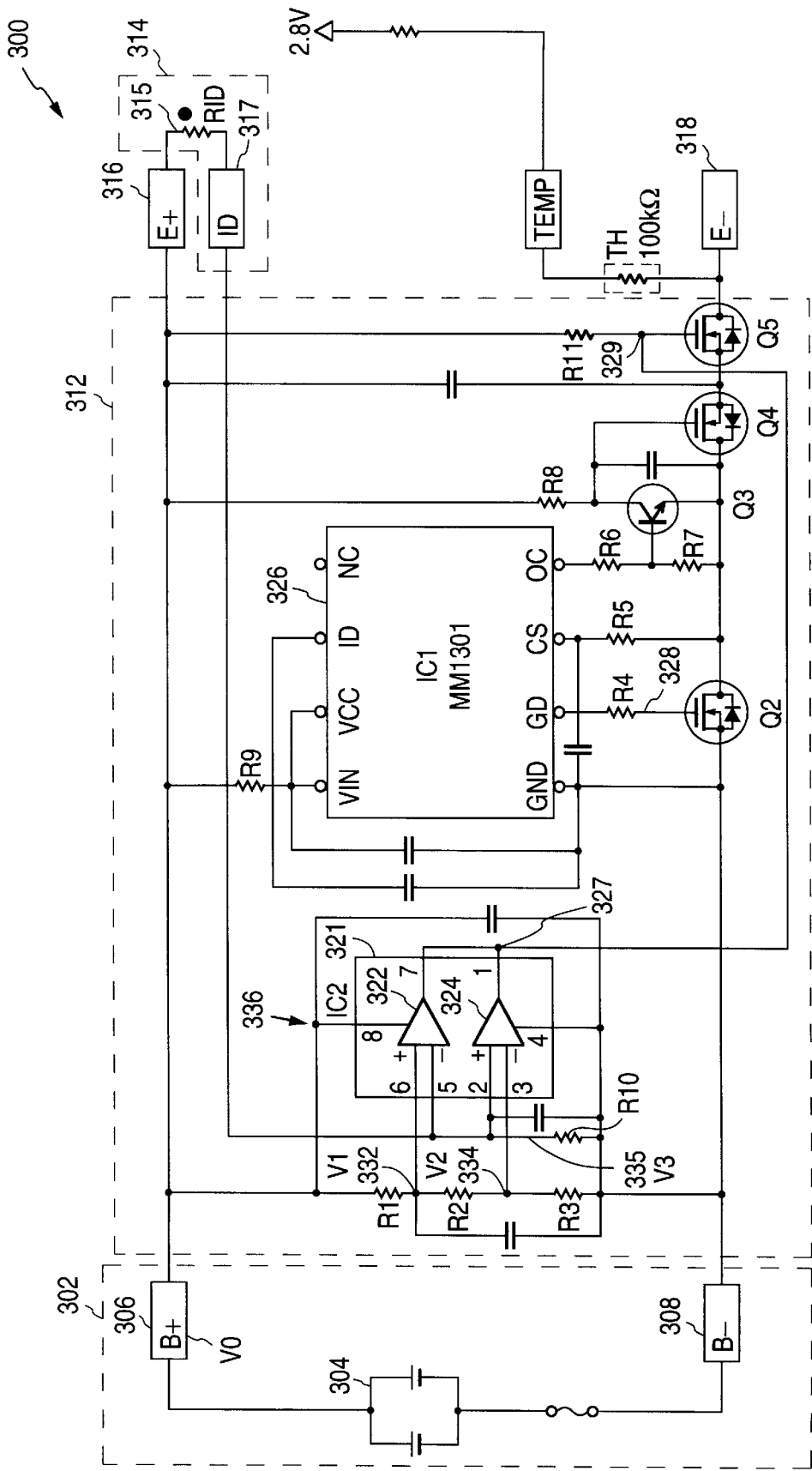
FIG. 3 is a battery system 300 capable of protecting battery output terminals from shorting, in accordance with another embodiment of the present invention.

Referring to FIG. 3, there is shown a battery system 300, in which the components of the battery system 100 are depicted in greater detail, in accordance with another embodiment of the present invention.

As shown in FIG. 3, the battery system 300 includes a battery unit 302, a control circuit 312, an activating mechanism 314, and a pair of voltage output terminals 316 and 318. The battery unit 302, activating mechanism 314, and voltage output terminals 316 (E−) and 318 (E+) are all coupled to the control circuit 312.

The battery unit 302 includes a rechargeable battery cell 304, and at least a pair of battery terminals 306 (B−) and 308 (B+). The battery cell 304 provides an open circuit voltage V0 at the positive battery terminal 306.

Like the activating mechanism 214, the activating mechanism 314 includes a removable resistor identifier (RID) 315 connected between the positive voltage output terminal 316 and an activating signal input terminal (ID) 317. As will be explained in more detail later in this specification, the RID 315 can be installed the connectors of the electronic devices.

The control circuit 312 includes three N-channel field-effect transistors (Q2, Q4, Q5), an NPN junction transistor (Q3), eleven resistors (R1–11), an open-drain type voltage comparator 321 (including two operation amplifies 322 and 324), and a battery protection circuit 326 (which is the same as battery protection circuit 226). Of these elements, the detecting circuit 336 includes the resistors R1–R3, R10, and the open-drain type voltage comparator 321.

In voltage comparator 321, each of the open-drain operational amplifiers 322 or 324 has a positive input and a negative input. The operational amplifier 322 or 324 generates a logic low voltage (L), if an input voltage on its positive input is less than that on its negative input. The operational amplifier 322 or 324 is set in an open state if an input voltage on its positive input is greater than that on its negative input. Using the voltage from the positive terminal 306 (E+), R11 pulls the output 327 of the comparator 321 to a logic high voltage (H) when the operational amplifiers 322 and 324 are both in an open state. Since the outputs of operational amplifiers 322 and 324 are connected together, output 327 of the comparator 321 generates a logic high voltage (H), only when the operational amplifiers 322 and 324 are both in an open state.

In the control circuit 312, under the control of the output voltage from the comparator 321, Q5 disconnects the negative battery terminal 308 (B−) from the negative voltage output terminal 318 (E−) (when Q5 is turned off), and connects the negative battery terminal 308 (B−)to the negative voltage output terminal 318 (E−) (when Q5 is turned on). The conditions to turn on Q2 are designed in accordance with the following equations:

$$2.8V < V0 < 4.3V \text{ (V0 is the battery voltage range)}; \quad (15)$$

$$R1 = R3 = 5R2; \quad (16)$$

$$V1 = [(R1+R2)/(R1+R2+R3)] \times V0 = [(6R2)/(11R2)] \times V0 = (6/11)V0; \quad (17)$$

$$V2 = [R2+(R1+R2+R3)] \times V0 = [(5R2)/(11R2)] \times V0 = (5/11)V0; \quad (18)$$

$$V3 = [R10/(RID+R10)] \times V0; \quad (19)$$

$$(5/11)V0 < V3 < (6/11)V0; \quad (20)$$

$$V1 < 3.5; \quad (21)$$

and $$V2 > 1.7V. \quad (22)$$

From equations (11)–(18):

$$(5/6)R10 < RID < (6/5)R10 \quad (23)$$

In the control circuit 312, R1, R2 and R3 form a voltage divider for providing a voltage V1 (on the connecting point 332) to the positive input of operational amplifier 322 and for providing a voltage V2 (on connecting point 334) to the negative inputs of the operational amplifier 324. Together with RID 315, R10 forms a voltage divider for providing a voltage V3 (on connecting point 335) to the negative input of operational amplifier 322 and the positive input of the operational amplifier 324.

When attached between the positive voltage output terminal 316 (E+) and activating signal input terminal 317 (ID), the RID 315 provides the battery cell 304 with a current path (through: the positive battery terminal 306 (B+), the positive voltage output terminal 316 (E+), the RID 315, the activating signal input terminal 317 (ID), R10, and the negative battery terminal 208 (B−)). The current in the path generates the voltage V3 (on the connecting point 335). In response to voltages V1, V2 and V3, the voltage comparator 321 provides an output voltage to gate 329 of Q5.

In operation, when the RID 315 is detached from the positive voltage output terminal 316 (E+) and activating signal input terminal 318 (ID), the operational amplifier 322 is open, because the voltage V1 ((6/11)V0) at its positive input is greater than the voltage V3 (zero volt) at its negative input; the operational amplifier 324 generates a logic low voltage (L), because the voltage V3 (zero volt) at its positive input is less than V1 ((6/11)V0) at its negative input. Thus, the comparator 321 provides a low logic voltage (L) to gate 329 of Q5. As a result, Q5 is turned off, disconnecting the negative battery terminal 308 (B−) from the negative voltage output terminal 318 (E−). At this time, even if the voltage output terminals 316 and 318 are directly connected, it will not cause shorting to the battery cell 304.

Under the conditions of equations (15)–(23), when the RID 315 is connected between the positive voltage output terminal 316 (E+) and the activating signal input terminal 317 (ID), the operational amplifier 322 is open, because voltage VI ((6/11)V0) at its positive input is greater than voltage V3 ([R10/(R10+RID)]×V0) at its negative input; the operational amplifier 324 is also open, because voltage V3 ([R10/(R10+RID)]×V0) at its positive input is greater than voltage V1 ((6/11)V0) at its negative input. Thus, the comparator 321 provides a high logic voltage (H) to the gate 329 of Q5 to turn on Q5. At this time, the GD terminal of the battery protection circuit 326 provides a high voltage to turn on Q2. The OC terminal of the battery protection circuit 326 provides a low voltage to turn off Q3. Q4 is turned on because the collector of Q3 provides a logic high voltage (H). As a result, the negative battery terminal 308 (B−) is connected to the negative voltage output terminal 318 (E−).

Advantageously, an output voltage appears on the voltage output terminals 316 (E+) and 318 (E−), only when a resistor with a resistance between (5/6)R10 and (6/5)R10 is connected between the positive voltage output terminal 316 (E+) and the activating signal input terminal 317 (ID).

In the embodiments shown in FIGS. 2 and 3, the RID (215 or 315) can be installed on the power connector of an electronic device in a position such that when the battery system (200 or 300) is attached to the power connector of the electronic device, the RID (215 or 315) will be automatically inserted between the positive voltage output terminal E+ (216 or 316) and the activating signal input terminal ID (217 or 317).

Figure 4:
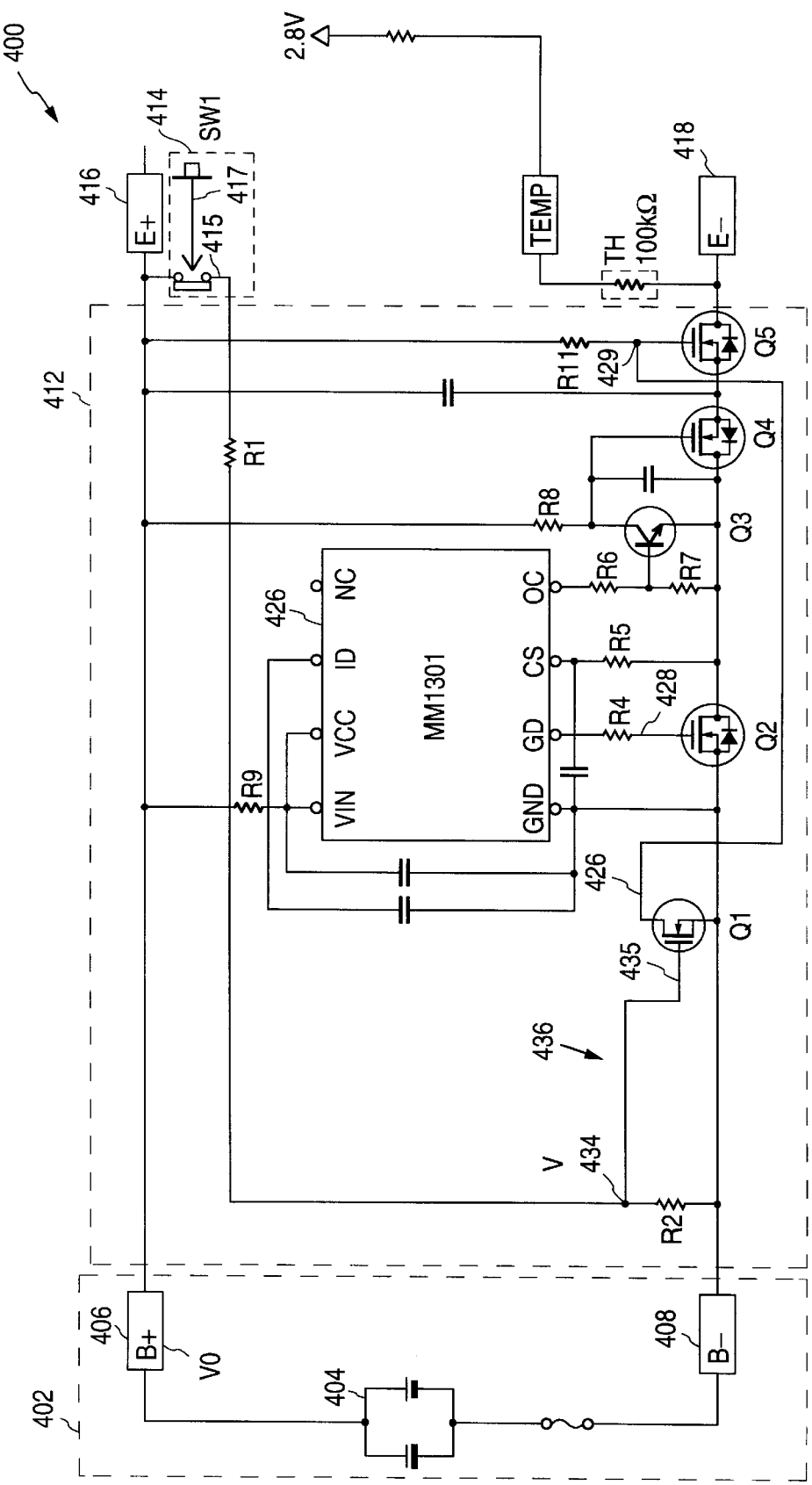
FIG. 4 is a battery system 400 capable of protecting battery output terminals from shorting, in accordance with still another embodiment of the present invention.

Referring to FIG. 4, there is shown a battery system 400, in which the components of the battery 100 are depicted in greater detail, in accordance with still another embodiment of the present invention.

As shown in FIG. 4, the battery system 400 includes a battery unit 402, a control circuit 412, an activating mechanism 414, and voltage output terminals 416 (E+) and 418 (E−). The battery unit 402, control circuit 412 and voltage output terminals 416 and 418 are all coupled to the control circuit 412.

The battery unit 402 includes a rechargeable battery cell 404, and at least a pair of battery terminals 406 (B+) and 408 (B−).

The activating mechanism 414 includes a switch 415 and a switch pushing bar 417.

The control circuit 412 includes four N-channel field effect transistors (Q1, Q2, Q4, Q5), an NPN junction transistor (Q3), nine resistors (R1–2, R4–9, R11), and a battery protection circuit 426.

In the control circuit 412, under the control of the drain 426 of Q1, Q5 disconnects the negative battery terminal 408 (B−) from the negative voltage output terminal 418 (E−) (when Q5 is turned off), and connects the negative battery terminal 408 (B+) to the negative voltage out terminal 418 (E−) (when Q5 is turned on). R1 and R2 form a voltage divider for providing an input voltage V on connecting point 434 to gate 435 of Q1. The resistance of R2 is selected far greater than that of R1 (R2>>R1).

In operation, when the battery system 400 is detached from an electronic device, the switch 415 is always in a closed position, and the connecting point 434 between R1 and R2 provides a logic high voltage (H) to turn on Q1. The drain 426 of Q1 then provides a logic low voltage (L) to the gate 429 of Q5. As a result, Q5 is turned off, disconnecting the negative battery terminal 308 (B−) from the negative voltage output terminal 318 (E−). At this time, even if the voltage output terminals 416 and 418 are conductively connected, it will not cause shorting to the battery cell 404.

When the battery system 400 is attached to an electronic device, the switch pushing bar 417 is moved by the attaching action to push the switch 415 to an open position, and no operating voltage appears on the connecting point 434 (input voltage V=0) between R1 and R2. Thus, Q1 is open, generating a logic high voltage (H) to the gate 429 of Q5. The logic high voltage (H) from the drain 426 of Q1 turns Q5 on through R11, connecting the negative battery terminal 408 (B−) to the negative voltage output terminal 418 (E−).

Advantageously, an output voltage appears on the voltage output terminals 416 and 418, only when the battery system 400 is attached to an electronic device.

Figure 5:
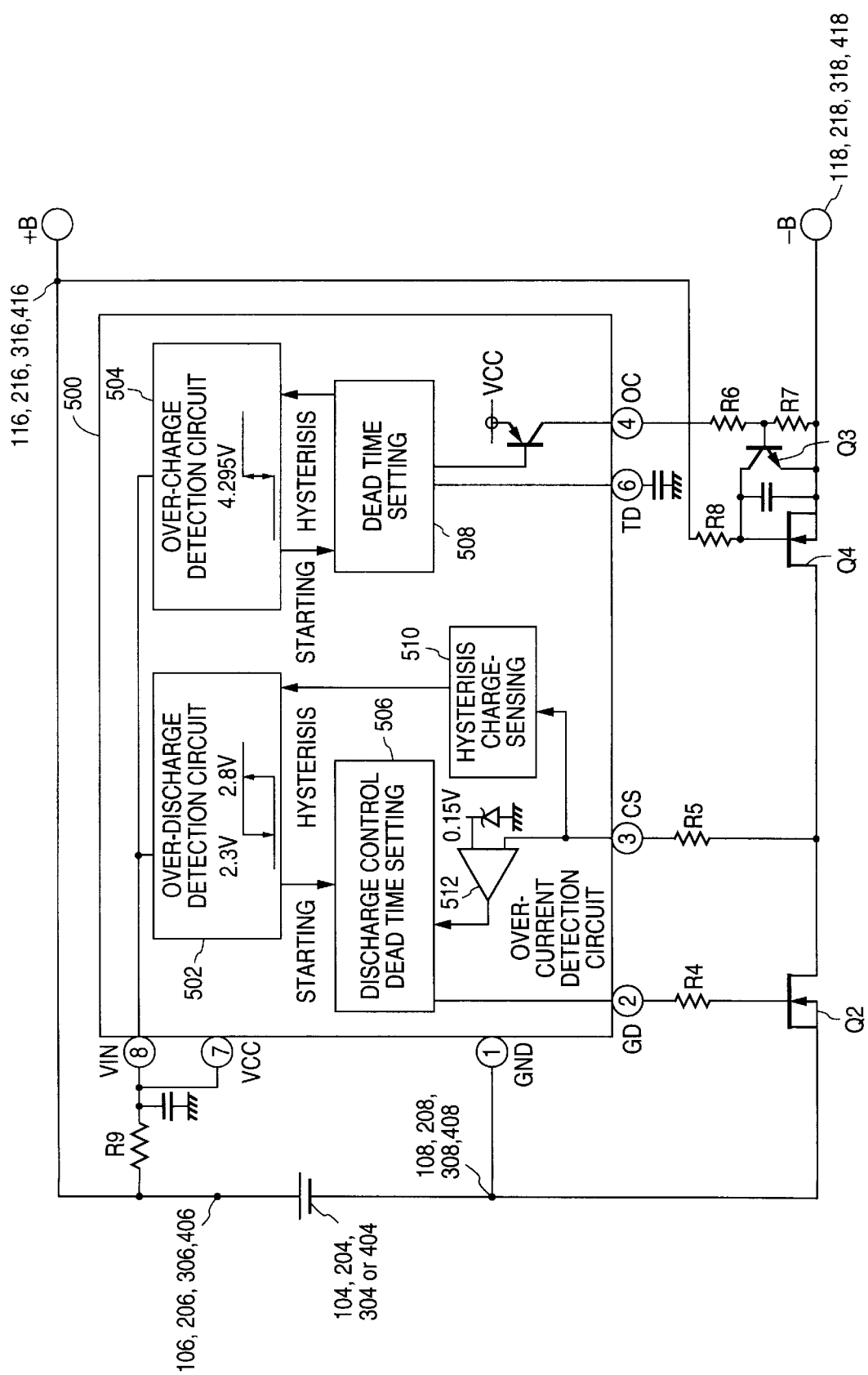
FIG. 5 is a block diagram of a battery protection circuit shown in FIGS. 1–4.

Referring to FIG. 5, there is shown a block diagram for an MM1301 integrated circuit 500 manufactured by Mitsumi Co., Ltd., which is utilized as the battery protection circuit (126, 226, 326 or 426) shown in FIGS. 1–4.

As shown in FIG. 5, the integrated circuit 500 includes an over-discharge detection circuit 502, an over-charge detection circuit 504, a discharge control dead time setting circuit 506, a dead time setting circuit 508, a hysteresis charge sensing circuit 510, and an over-current detection circuit 512. The integrated circuit 500 has seven terminals or pins (GND, GD, CS, OC, TD, Vcc and Vin), which provide the following functions:

(1) The GND terminal is connected to the negative voltage output of the rechargeable battery cell (104, 204, 304, or 404);

(2) The GD terminal is "on" to turn Q2 "on", when discharge current is within a normal range. The GD terminal is "off" to turn Q2 "off", when discharging current exceeds a predetermined current value, protecting the rechargeable cell (104, 204, 304, or 404) from over-current discharging.

(3) The CS terminal detects an over-current discharge condition by detecting the voltage drop across Q2.

(4) The OC terminal provides an overcharge signal. The OC terminal is "off" to turn Q3 "off" and Q4 "on", when the charge voltage is within a normal current range. The OC terminal is "on" to turn Q3 "on" and Q4 "off", when the charging voltage exceeds a predetermined voltage value, protecting the rechargeable cell (104, 204, 304, or 404) from over-voltage charging.

(5) The TD terminal is for dead time setting for over-charging detection.

(6) The Vcc terminal is connected to the positive terminal of rechargeable battery cell (104, 204, 304, or 404) for supplying operating voltage for the circuits in integrated circuit 600.

(7) The Vin terminal is connected to the positive terminal of rechargeable battery cell.

Note that in all of the embodiments, the battery unit 102, 202, 302, and 402 covers up at least one, and preferably both, of the battery terminals 106, 108; 206, 208; 306, 308; and 406, 408 from electrical contact with objects outside of the battery unit. Thus, the only way for power from the battery to be dissipated is through the switching circuits 146, 246, 346, or 446.

Although the present invention has been shown and described with respect to preferred embodiments, various changes and modifications are deemed to lie within the spirit and scope of the invention as claimed. The corresponding structures, materials, acts, and equivalents of all means or step plus function elements in the claims which follow are intended to include any structure, material, or acts for performing the functions in combination with other claimed elements as specifically claimed.

What is claimed is:

1. An apparatus for preventing short circuiting of a battery having at least a pair of terminals which are intended to be electrically connected to an electronic device having at least a pair of power terminals, comprising:

a battery unit which houses the battery;

a first voltage supply terminal connected to a first battery terminal;

a second voltage supply terminal;

a switch connected between a second battery terminal and the second voltage supply terminal and with one or more of the battery terminals being insulated from electrical contact from outside of the battery unit;

a triggering device attached to either the electronic device or the battery unit, wherein the triggering device is a resistor having a predetermined value within a predetermined range of values;

an activating circuit for generating an activating signal when the resistor of the triggering device is connected in the activating circuit upon attachment of the battery unit to the electronic device;

a detecting circuit connected to the switch for detecting the activating signal and wherein the switch connects the second battery terminal to the second voltage supply terminal when the activating circuit supplies the activating signal to the switch; and wherein the triggering device only triggers the activating circuit when the battery unit is mounted on the electronic device.

2. The apparatus according to claim 1, wherein the battery provides an operating voltage to the activating circuit and switch.

3. The apparatus according to claim 2, wherein the battery, the activating circuit and the switching circuit are assembled as a battery unit.

4. The apparatus according to claim 3, wherein the battery is a rechargeable battery.

5. The apparatus according to claim 1, wherein the activating signal is a voltage and the detecting circuit includes a voltage detector.

6. The apparatus according to claim 1, wherein the activating signal is a voltage and the detecting circuit includes a voltage comparator.

7. An apparatus comprising:
(a) a battery (404);
(b) at least a pair of voltage output terminals (416, 418) for providing an output voltage supplied by the battery;
(c) a switch (415, 417); and
(d) a switching circuit (412) controlled by the switch for disconnecting the battery from the voltage output terminals before the switch is triggered, and for connecting the battery to the voltage output terminals after the switch has been triggered;

wherein the battery, the switch and the switching circuit are assembled as a battery unit, with one or more of the battery terminals insulated from contact from outside of the battery unit, and the switch is triggered by attaching the battery unit to an electronic device.

8. A method of preventing short circuiting of at least a pair of terminals of a battery when the battery is not connected to an electronic device comprising the steps of:

providing a housing for the battery which covers at least one of the battery terminals;

providing a switch between at least one terminal of the battery and one power terminal of the electronic device;

automatically detecting whether or not the battery housing is physically connected to the electronic device;

automatically opening the switch when it is detected that the battery housing is physically disconnected from the electronic device, automatically closing the switch when it is detected that the battery housing is physically connected with the electronic device; and wherein the automatically detecting step comprises the steps of:
  detecting, as the battery housing is physically connected to the electronic device, a resistance of a resistor having a value within a predetermined range of values and which is mounted on the electronic device; and
  generating a control signal to close the switch when a detected resistance is within the predetermined range of values.

9. The method according to claim 8, wherein the automatically detecting step comprises the steps of:
  completing an electrical circuit to control the switch to close when the battery housing is physically connected to the electronic device.

10. An apparatus comprising:
(a) a battery;
(b) at least a pair of voltage output terminals for providing an output voltage supplied by the battery to an electronic device;
(c) an activating circuit for providing an activating signal only when a resistor with a pre-selected resistance value is connected to the activating circuit; and
(d) a switching circuit for disconnecting the battery from the voltage output terminals in the absence of the activating signal, and for connecting the battery to the voltage output terminals in response to the activating signal.

* * * * *